(No Model.) 2 Sheets—Sheet 1.
B. O. BUSH.
TARGET TRAP RELEASING DEVICE.
No. 534,948. Patented Feb. 26, 1895.
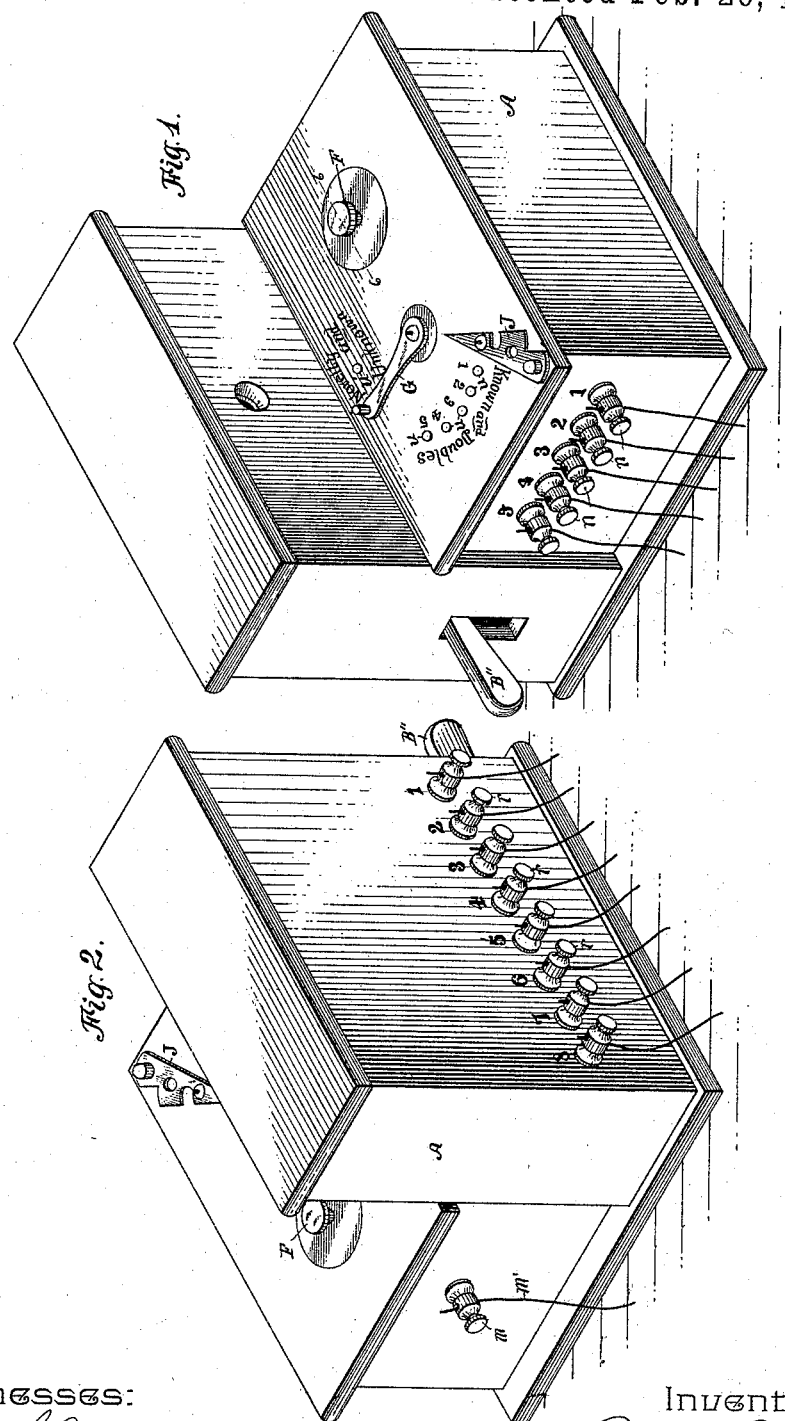
Witnesses:
Walter S. Hood
Vene E. Chappell
Inventor,
Ben. O. Bush
By Fred L. Chappell
Att'y.

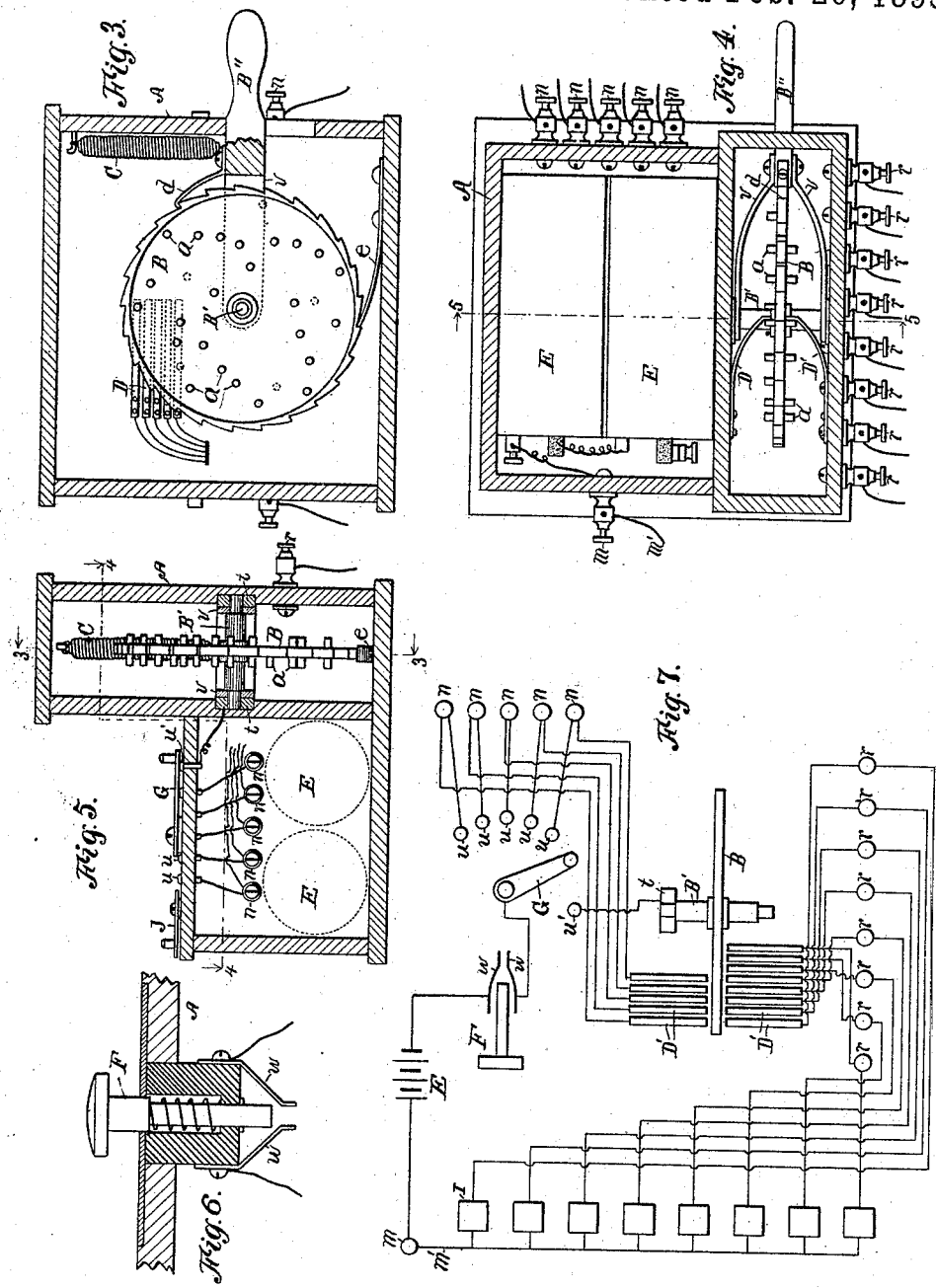

UNITED STATES PATENT OFFICE.

BENJAMIN O. BUSH, OF KALAMAZOO, MICHIGAN.

TARGET-TRAP-RELEASING DEVICE.

SPECIFICATION forming part of Letters Patent No. 534,948, dated February 26, 1895.

Application filed May 14, 1894. Serial No. 511,165. (No model.)

*To all whom it may concern:*

Be it known that I, BENJAMIN O. BUSH, a citizen of the United States, residing at the city of Kalamazoo, in the county of Kalamazoo and State of Michigan, have invented certain new and useful Improvements in Electrical Trap-Indicator Pulls, of which the following is a specification.

My invention relates to trap shooting apparatus and particularly to electric trap pulls and the manner in which the traps are released or sprung.

This invention is an improvement on my trap indicator for which I made application for Letters Patent February 1, 1894, Serial No. 498,744.

In trap shooting tournaments, a number of traps for throwing targets are used to throw flying targets in different directions. Some of the targets thus thrown are difficult shots and some are easy shots. In the ordinary way, traps are indicated by numbers, and the traps to be sprung for each shot are chosen by chance purely. As heretofore practiced, all shots were chosen by chance. With the limited number of shots for each shooter, there was very likely to be a want of equality as one may receive all easy shots and the other all difficult ones or the proportion of easy and difficult shots may vary which is not at all satisfactory to all concerned. This improved indicator and pull accomplishes all of the good results of my trap indicator above referred to and also overcomes objections to which that indicator is open. In this device, all the traps are sprung or released by an electrical device which is operated by a single lever, whereas in that device there was a lever for each trap to be sprung. By having all to be operated by a single lever and to be operated successively, it is utterly impossible for the operator, or puller, or anyone in his vicinity to tell which trap will be sprung next so that he can signal it to a shooter in advance; and the operator of the indicator is more thoroughly prevented from springing any trap that he might choose to do fraudulently than in that device. Again this device requires no attention but simply to operate the lever, and this device is further completely adapted to shooting what are known as "double targets" (two at a time) and also to throw targets from traps known to the shooters as agreed upon in advance by the shooters.

I accomplish the objects of my invention by the device shown in the accompanying drawings, in which—

Figure 1 is a front view in perspective of my improved trap indicator pull. Fig. 2 is a back view of the same. Fig. 3 is a sectional view on line 3—3 of Fig. 5. Fig. 4 is a sectional view on line 4—4 of Fig. 5. Fig. 5 is a view partly in section on line 5—5 of Fig. 4. Fig. 6 shows a detail of the circuit closer; and Fig. 7 shows the system of wiring of my improved device. All of the sectional views are taken looking in the direction of the little arrows at the ends of the section lines.

Similar letters of reference refer to similar parts throughout the several views.

A represents the exterior case of my improved trap indicator and pull which may be made in any form to suit the fancy of the user. In the vertical, upright portion of the case, is a ratchet wheel, B, mounted on the axle, B', which is journaled into the journal bearing, $t$, and a close connection is made between the journal bearing and the axle which insures a perfect electrical contact between the box and the wheel. In the sides of this ratchet wheel, B, are inserted numerous small pins, $a$. Near each side of the wheel, are placed elastic copper strips, D, D', which act as brushes to come in contact with the small pins, $a$, successively and complete the circuit. The pins, $a$, are so arranged upon the wheel that their connection with the copper strips, D and D', varies so that the operator or those using the device are unable to tell, when one has come in contact with the strips, D, D', which pin and strip will next come in contact, the whole being incased. These strips and pins coming into electrical contact form a circuit by which the various traps are sprung. The ratchet wheel is operated by the lever, B'', divided into arms, $v$, to each side of the wheel which are pivoted to the axle of the wheel. A metallic spring pawl, $d$, engages the notches of the ratchet. Another detent pawl, $e$, holds the wheel in place. A coiled spring, $c$, is connected to the lever, B'', and the upper part of the case to return the lever so that the pawl, $d$, will engage the next notch to operate the wheel. The lever, B'', is depressed to the limit of its motion in the slot on the side of the box, when it is allowed to return. Each depression of the lever moves the wheel along one notch. Connected with the spring copper strips, D, D', are electric wires which are connected to binding posts. Those on the outer side connected to the strips, D', are connected to the binding posts, r, r, r, on the back of the case. The strips, D, toward the front of the case are connected by wires to the binding posts, n, n, n, which may be connected with the strips at the outside, if preferred instead. In the front part of the case, are situated two batteries, E, E, or some other number as may be required to afford sufficient current to operate the electric release on the traps. One pole of these batteries is connected to the binding post, m, which is also connected by wire m' to each of the traps, I, which are connected by wires to the opposite pole of the battery through the circuit closer, F, which operates by being crowded between the two springs, w, w, as indicated in Fig. 6. The wire from the circuit closer connects with the switch, G, which connects with the pin, u', or the pins, u, u, u, by swinging it to the appropriate position. The pin, u', connects with the journal box, t, of the wheel, B, and so establishes an electrical connection with the wheel, B. Wires extend from the pins, u, u, to the spring copper strips, D. In use, the operation of my improved trap indicator and pull is about as follows: It will be noted that there are twenty-five notches on the ratchet wheel which in its carrying around will form twenty-five connections by the pins, a, coming in electric contact with the copper strips, D and D'. It will be noted that the pins appear to be arranged in no regular order. They are so arranged that the same strip, D, will come in contact with more than one of the pins in passing around so that when any trap is sprung, it will be impossible to tell what trap will next operate. The pins, a, are arranged exactly on radial lines to the ratchet notches so that they will successively come in contact with the spring copper strips, D or D', as the case may be. It will be noted that when one of the copper strips, (D' for instance) is in contact with one of the pins and the switch, G, rests on the pin, u', then if the circuit closer, F, be closed, the circuit will pass from the battery through the circuit closer, F, through the switch, G, on to the pin, u', on to the wheel, B, through its axle, out through the pin which connects with the particular strip, D', which connects with the binding posts, on and out to the trap which it releases, through the ground plate back to the battery, completing the circuit, and that the trap released will be the particular trap that happens to come into the circuit, and the circuit will be changed to take in the different traps as the wheel rotates. This comes by proper arrangement of the pins and copper strips, D, D', which it is unnecessary to explain here. This springs a series of traps in unknown order which enables the sportsmen to shoot in their matches what is known as the "Novelty" system. It will be noted that the location of the pins, a, is positive and the pins are so arranged that when the device is in operation, the traps to be sprung are unknown even to the operator or the shooter or to any one examining the traps and no one can tell in what order they will be pulled or sprung because as in my device, described in my former application above mentioned, the connection for each trap occurs several times on the revolution of the wheel and is followed by a different trap each time; yet it will be known that each shooter will have the same number of difficult shots and easy shots and so will have an equal chance with the others in the test.

When it is desired to shoot what is called "known shots" from known traps, the switch, G, is swung to the pins, u, u, u, and the binding posts, n, n, n, are connected directly with the traps to be sprung and by swinging the switch, G, the exact shot will be known because the numbers of these pins, u, u, u, correspond with the numbers of the traps. In shooting the doubles which involves a throwing of two flying targets at a time, by springing two separate traps simultaneously the result is attained by the auxiliary switch, J, which by being swung in position can be made to cover two of the pins, u, u, so that by bringing the switch, G, into contact with this switch, J, two of the traps will be operated at once because two of the circuits will be closed. By connecting the wires of five of the traps with the binding posts, n, n, and setting the switch, G, at the point u' and operating the lever, B'', systems of five unknown shots can be operated which accomplishes what in the language of the shooters is known as "five unknowns."

The object of my device is readily apparent. It accomplishes by a simple shifting of the switches, all the changes that it is possible to accomplish, and it also prevents any fraudulent practice that might be attempted in the operation of my trap indicator. This device is purposely constructed so that the order of the traps to be sprung or targets thrown cannot be seen, foretold or indicated to a shooter by any one, because it is impossible for the puller himself to know.

My improved device is capable of considerable variation and I do not wish to be confined to the exact details here shown.

Having thus described my invention, what I claim as new, and desire to secure by Letters Patent, is—

1. In an apparatus of the class described, the combination of the case, A, the ratchet wheel, B, mounted on the axle, B', and bearing the pins, a; the elastic copper strips, D, D', connected by suitable wires to electrically release traps, I; the battery, E, connected to all of the traps, I, through a suitable wire, m'; the battery, E; the circuit closer, F, and the switch, G, adapted to connect with the pin, u', which is in electrical connection with the hub of the wheel, B; the pins, a, and the copper strips, D, D', being arranged to close the circuits in a series, the closers of each series being arranged in no regular order, all substantially as described for the purpose specified.

2. In apparatus of the class described, the combination in a single case, of a ratchet wheel, B, with pins, a, and copper strips, D, D', for effecting a switching of the current through different traps to operate them as specified; a switch, G, and pins, u, u, u, for throwing the same current by connection with the pins u, u, successively in known order; and a complex switch, J, to connect the same pins by means of the switch, G, so that two known traps can be sprung simultaneously by the apparatus all contained in one case combined and arranged as specified for the greater convenience in operating said device, all substantially as described.

3. In apparatus of the class described, the combination of the wheel, B, in electrical connection with one pole of the battery and having pins, a; strips, D', each connected by a separate conductor with an electrical release of a trap; a suitable connection to all of said traps with the opposite pole of said battery and means of rotating the wheel so that the pins, a, shall strike the strips, D', successively causing the circuits to be closed in series, the closures of each series being arranged in no regular order, for the purpose specified.

4. In apparatus of the class described, the combination of the wheel bearing projections and in electrical connection with a battery; a series of depressible members adapted to come opposite said projections, said depressible members being in electrical connection with electrically released traps; suitable means of rotating said wheel to strike said projections against the depressible members and cause the connections to take place to spring the traps in the order specified.

5. In apparatus of the class described, the combination of a movable member bearing projections in electrical connection with a battery; a series of depressible members adapted to come opposite said projections, said depressible members being in electrical contact with electrically released traps; suitable means of moving said movable member to bring the projections against the depressible members and cause the electrical connections to take place to spring the traps in the order specified.

6. In apparatus of the class described, the combination of a movable member with points adapted for electrical connection, the said member being in electrical connection with a source of electric supply; a series of parts adapted to come in electrical contact with the points on said movable member, each part being connected with an electrically released trap; and suitable means of moving the said movable member to bring the points of electrical contact in contact with the separate parts above described to cause the current to pass to spring the traps in the order specified.

7. In apparatus of the class described, pins, u, u, in electrical connection with the electrically released traps; a switch, J, with portions cut away so that by swinging it over said pins different pairs of them may be brought in connection and the circuit closer to send an electrical current through said switch and throw two targets simultaneously to give a double shot, for the purpose specified.

In witness whereof I have hereunto set my hand and seal in the presence of two witnesses.

BEN. O. BUSH. [L. S.]

Witnesses:
A. D. HARRIS,
WALTER S. WOOD.